United States Patent
Gameiro

(10) Patent No.: US 9,089,907 B2
(45) Date of Patent: Jul. 28, 2015

(54) METHOD FOR MACHINING THE CONNECTING ROD PASSAGE IN A CYLINDER CRANKCASE, CYLINDER CRANKCASE AND ENGINE OBTAINED USING THE METHOD

(75) Inventor: Andre Gameiro, Acheres (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 14/004,275

(22) PCT Filed: Mar. 5, 2012

(86) PCT No.: PCT/FR2012/050453
§ 371 (c)(1),
(2), (4) Date: Sep. 11, 2013

(87) PCT Pub. No.: WO2012/123659
PCT Pub. Date: Sep. 20, 2012

(65) Prior Publication Data
US 2013/0340704 A1      Dec. 26, 2013

(30) Foreign Application Priority Data

Mar. 11, 2011   (FR) .................................... 11 51998

(51) Int. Cl.
*F02B 75/22*      (2006.01)
*B23C 3/00*      (2006.01)
(Continued)

(52) U.S. Cl.
CPC ... *B23C 3/00* (2013.01); *B23C 3/30* (2013.01); *F02F 7/0021* (2013.01);
(Continued)

(58) Field of Classification Search
CPC ...... F02F 7/0021; F02F 1/22; B23C 2220/04; B23C 3/00
USPC ......... 123/195 R, 193.1, 193.5, 193.4, 193.3, 123/193.2; 409/132; 29/888.06, 888.076, 29/888.08, 888.09, 888.1, 6.01
See application file for complete search history.

(56) References Cited

U.S. PATENT DOCUMENTS 3,811,163 A      5/1974   Frederick et al.
3,858,562 A *    1/1975   Lanpheer .................... 123/73 A
(Continued)

FOREIGN PATENT DOCUMENTS

DE      10 2005 051 185 A1     5/2007
EP              1 205 658 A1     5/2002
(Continued)

OTHER PUBLICATIONS

Preliminary Search Report issued Oct. 27, 2011 in French Application No. 1151998 (With English Translation of Category of Cited Documents).

*Primary Examiner* — Lindsay Low
*Assistant Examiner* — Long T Tran
(74) *Attorney, Agent, or Firm* — Oblon, McClelland, Maier & Neustadt, L.L.P.

(57) ABSTRACT

A method for machining a passage for a connecting rod in an internal combustion engine crank case upper half, including producing, at a base of the cylinder barrel, a straight cut of cylindrical shape capable of allowing the connecting rod a lateral excursion as a piston moves up and down in the cylinder, using a rotary milling tool which is plunge-operated from underneath the cylinder, and a direction of plunging of the milling tool is oriented at an oblique angle to the axis of the cylinder.

7 Claims, 5 Drawing Sheets

(51) Int. Cl.
    *B23C 3/30*    (2006.01)
    *F02F 7/00*    (2006.01)
(52) U.S. Cl.
    CPC .......... *F02F 7/0046* (2013.01); *B23C 2215/24* (2013.01); *B23C 2220/04* (2013.01); *B23C 2220/56* (2013.01); *Y10T 409/303808* (2015.01)

(56)         References Cited

U.S. PATENT DOCUMENTS 4,174,462 A  *  11/1979  Pearce ........................ 373/150
    4,184,462 A  *   1/1980  Hale ........................... 123/54.6
    4,276,812 A      7/1981  Dymond 4,419,797 A  *  12/1983  Sigloch et al. ................. 29/26 A
    5,189,994 A  *   3/1993  Gindentuller ................ 123/54.2
    5,404,846 A      4/1995  VanRens
    7,096,843 B2 *   8/2006  Kawamoto et al. ....... 123/195 R
    7,241,128 B2 *   7/2007  Blok ............................ 425/331
    2002/0096138 A1  7/2002  Metz et al.
    2012/0260503 A1* 10/2012 Licht ........................ 29/888.091

FOREIGN PATENT DOCUMENTS

FR              2.031.048        11/1970
    GB            1911 15473          0/1912
    GB               133443          11/1919
    WO        WO 2006/018238 A1       2/2006

* cited by examiner

METHOD FOR MACHINING THE CONNECTING ROD PASSAGE IN A CYLINDER CRANKCASE, CYLINDER CRANKCASE AND ENGINE OBTAINED USING THE METHOD

BACKGROUND

The present invention relates to the machining of cylinder crankcases of an internal combustion engine.

More specifically, the invention relates to a method for machining a connecting rod passage in a cylinder crankcase of an internal combustion engine, the crankcase and the engine produced in accordance with this method.

The method involves producing at the base of the cylinder shaft a straight cut of cylindrical form, which is capable of allowing the lateral travel of the connecting rod when the piston moves up and down in the cylinder, with a rotary milling tool which operates by means of travel below the cylinder.

A connecting rod of an internal combustion engine generally comprises a connecting rod little end, which carries the drive shaft of the piston, and a connecting rod big end which is connected to the crankshaft. The connecting rod little end has a bore which receives the drive shaft of the piston. The connecting rod big end also has a bore which receives a crankpin which is offset relative to the rotation axis of the crankshaft.

The connecting rod serves to connect the crankshaft to the piston in order to convert the rotation movement of the crankshaft into an alternating vertical displacement of the piston inside the cylinder. The big end thereof rotates with the crankshaft, whilst the little end thereof is displaced vertically with the piston between the positions of top dead centre and bottom dead centre, shown in FIG. 1. Between these two extreme positions, the connecting rod is raised and lowered with the piston, moving towards and moving away from the wall of the cylinder.

The openings which allow the travel of the connecting rod at the cylinder base, or connecting rod passages, are generally machined at the base of the cylinder shaft, using a rotating milling cutter which moves by means of vertical downward movements. The milling cutter acts on the base of the shaft from the front and the cut, or recess, formed in this manner is a straight cut in the lower portion thereof.

The frontal action on the cylinder shaft by the milling cutter involves a combined risk of rapid wear of the milling tool and of the skirt of the piston when it moves downward into contact with the recess.

BRIEF SUMMARY

An object of the present invention is to improve the quality of the machining carried out for the connecting rod passages of a cylinder, whilst limiting the risks of premature wear of the piston skirt and that of the milling tool.

To this end, the invention proposes that the direction of travel of the milling tool be orientated obliquely relative to the axis of the cylinder.

The cut of the connecting rod passage machined in the cylinder shaft is therefore orientated obliquely relative to the axis thereof.

BRIEF DESCRIPTION OF THE DRAWINGS

The present invention will be better understood from a reading of the following description of a non-limiting embodiment thereof, with reference to the appended drawings, in which.

DETAILED DESCRIPTION

Figure 1:
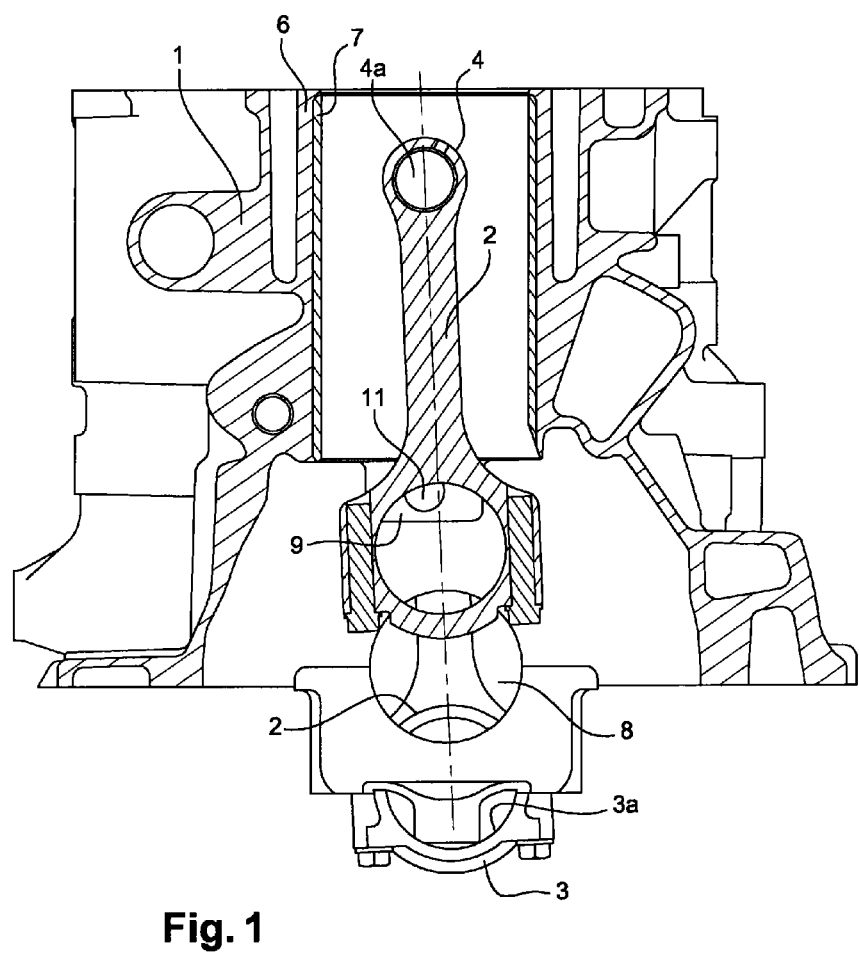
FIG. 1 shows the movement of a connecting rod in a cylinder crankcase.

FIG. 1 is a cross section of a cylinder crankcase 1 of an internal combustion engine, and the connecting rod 2 associated with the piston (not illustrated) close to the top dead centre and bottom dead centre positions thereof. The connecting rod big end 3 has a bore 3a which receives a crankpin (not illustrated) of the crankshaft. The connecting rod little end 4 has a bore 4a, which receives the drive shaft of the piston (also not illustrated). The shaft of the cylinder 6 is covered internally with a lining 7 which is normally inserted during the casting operation. The crankshaft passage 8 also appears in the plane of section between the two illustrations of the connecting rod 2. Behind this, it is possible to see the base of a vertical cylinder 9 having a smaller diameter than the previous one, which allows the release of the honing tool (not illustrated) used to carry out the finishing of the surface state of the shaft, and the through-hole 11 for the passage of gases extending horizontally through the cylinder 9.

Figure 2:
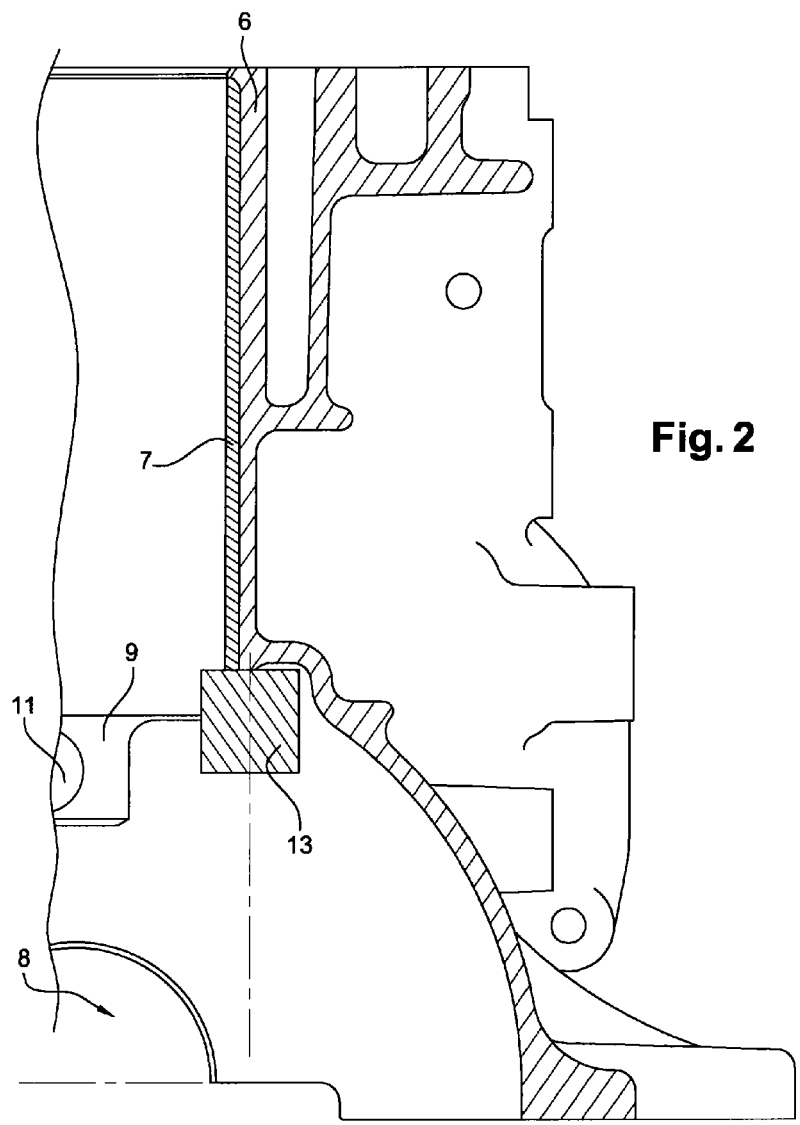
FIG. 2 shows a known method for machining connecting rod passages.
Figure 3:
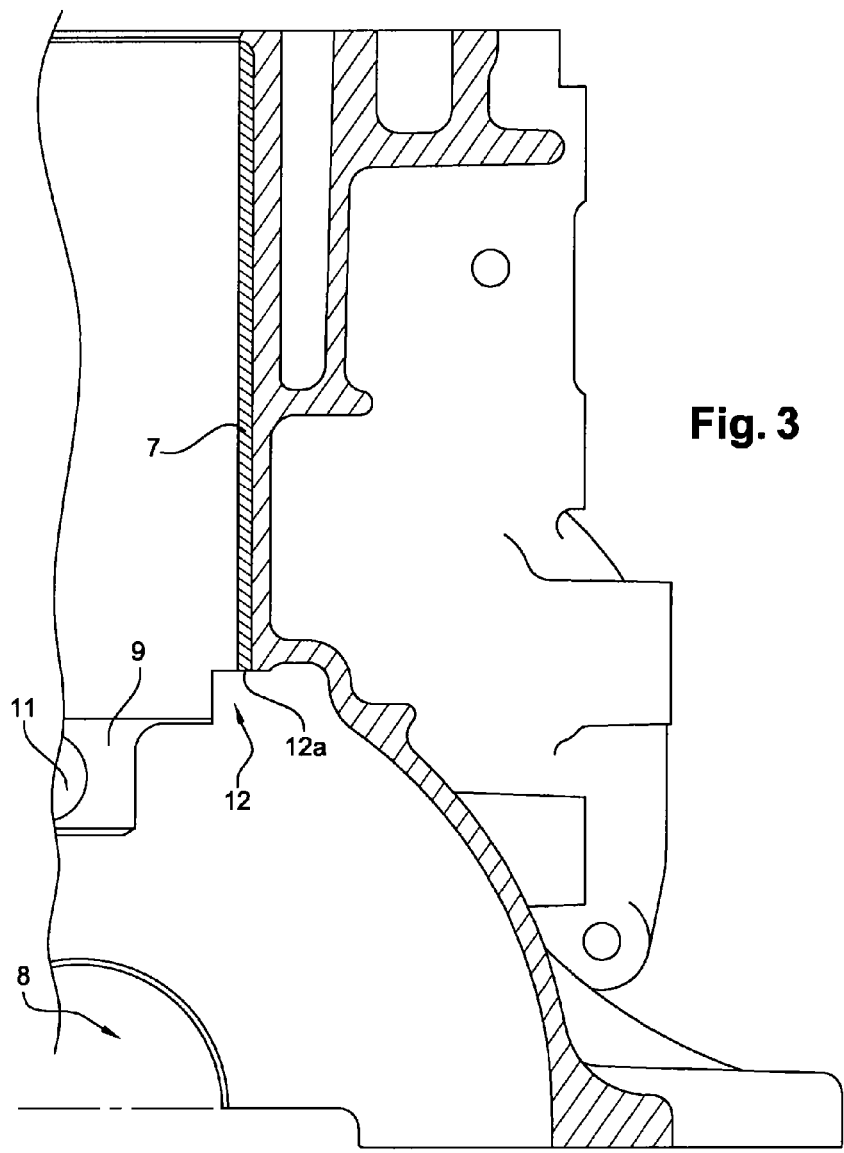
FIG. 3 shows the recess formed in accordance with the known method.

The enlarged view of FIGS. 2 and 3, in which the connecting rod is no longer shown, schematically illustrates the milling tool 13 in an operating position at the base of the shaft 6 (FIG. 2) and the recess 12 produced thereby in accordance with the known machining method, by means of vertical downward movements below the cylinder. The recess 12 formed in this manner is a straight cut which forms a sharp edge 12a at the base of the shaft 6. As indicated above, the frontal action on the base of the shaft by the milling tool leads to rapid wear thereof. Furthermore, the skirt of the piston (not illustrated) is also at risk of damage if it comes into contact with this edge and the lateral travel of the connecting rod is strictly limited by the height of the cut 12 at the base of the shaft, which has a sharp edge, as shown in FIG. 3.

Figure 4:
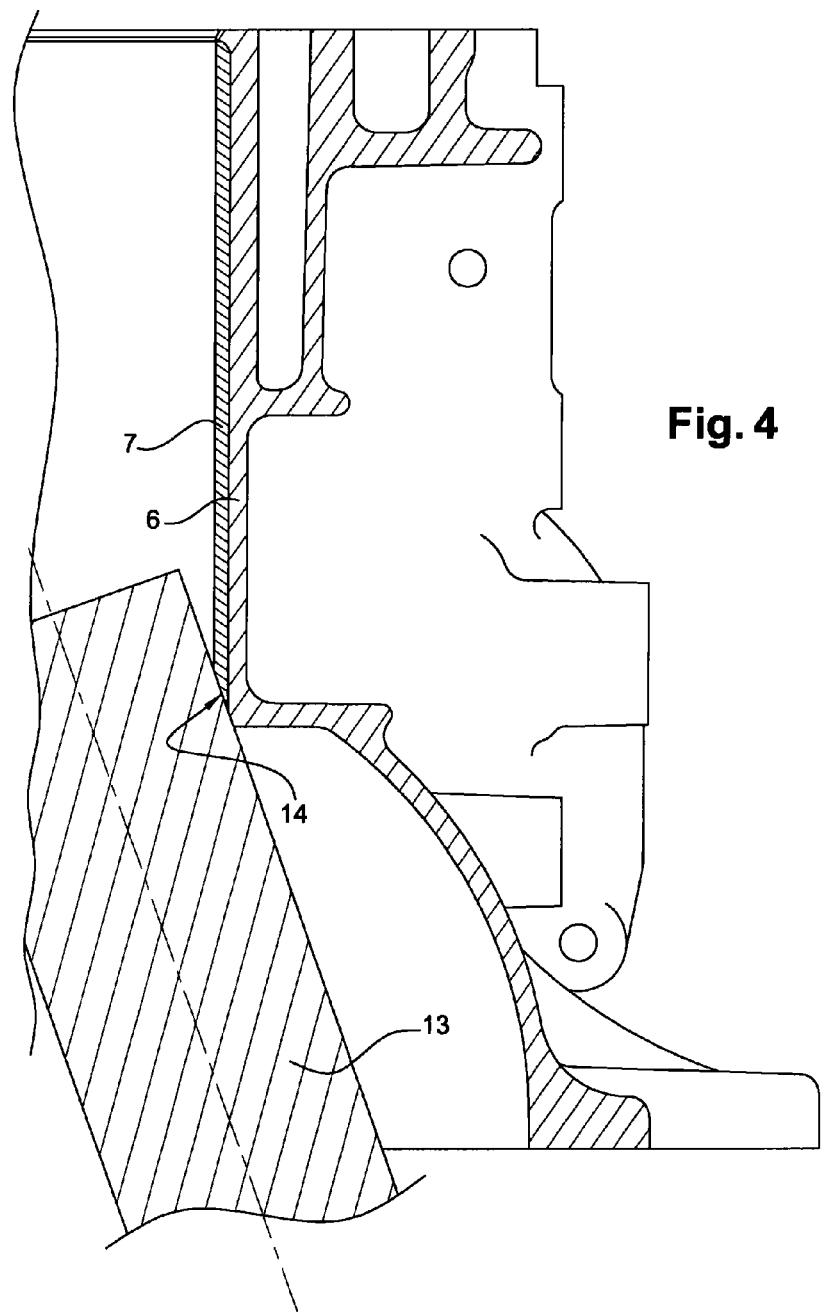
FIG. 4 shows the machining method proposed.

FIG. 4 shows a cylindrical milling tool 13 carrying out a downward movement which is no longer vertical but instead oblique in the cylinder. Such a machining operation is carried out with a less violent impact of the tool on the shaft 6. The surface of the recess or cut 14 is cylindrical. It is orientated in an oblique manner, in accordance with the axis of the downward movement of the tool. This surface is smaller than with the known method.

Figure 5:
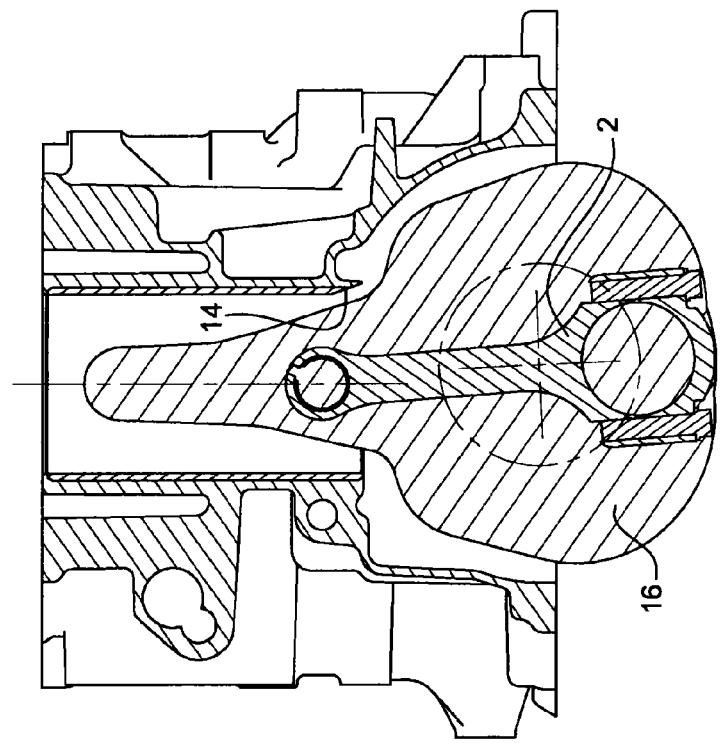
FIGS. 5 and 6 show the travel of the connecting rod in a crankcase machined in accordance with the invention.
Figure 6:
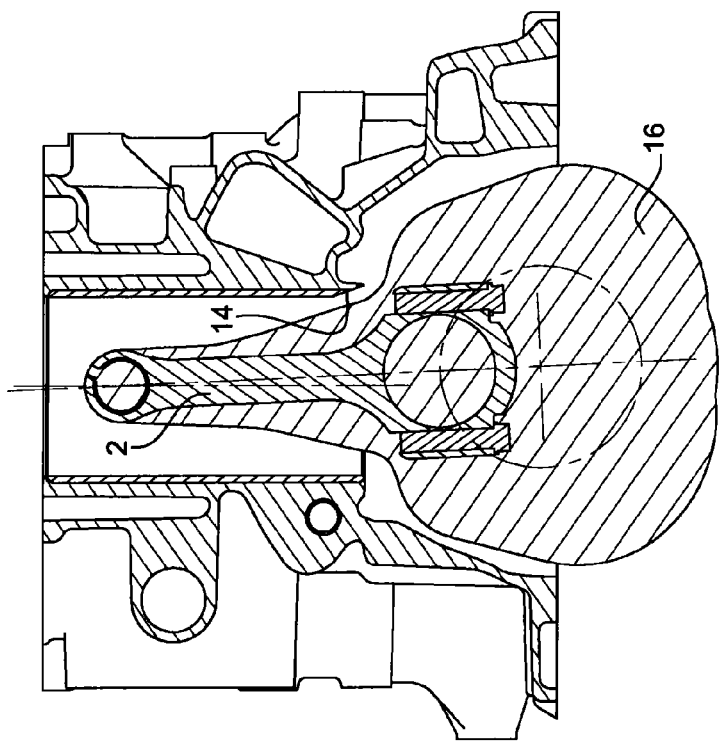

FIGS. 5 and 6 show the connecting rod 2 and illustrate the space 16 inside which the connecting rod moves around the crankshaft. This space is referred to by specialists as a "mandolin" as a result of its resemblance to the musical instrument of the same name. The shape thereof is imposed by the dimensions and the kinematics of the connecting rod.

The drawings show that the recess 14, produced according to the invention, allows sufficient space to be provided between the cylinder and the path of the connecting rod 3, when the piston is raised and lowered, in order to prevent any risk of impact in this region.

The connecting rod and the base of the cylinder shaft are thus protected from mutual impacts which may occur during operation as a result of the wear of components, or the increase of their operational plays during the life of the engine.

As indicated above, the invention further affords other advantages. In particular the skirt of the piston is no longer at risk of meeting the sharp edge when it moves in the lower portion of the shaft, close to the bottom dead centre. Finally, the milling tool is also protected from frontal impacts against the base of the shaft.

The invention claimed is:

1. A method for machining a connecting rod passage of a connecting rod, including a bore at a first end to receive a crankshaft, in a cylinder crankcase of an internal combustion engine, comprising:

producing at a base of a cylinder shaft a straight cut of cylindrical form, to allow lateral travel of the connecting rod in a plane perpendicular to a rotational axis of the bore of the connecting rod when a piston connected to the connecting rod at a second end moves up and down in the cylinder shaft, with a rotary milling tool that operates by travel in the plane perpendicular to the rotational axis of the bore of the connecting rod and below the cylinder shaft;

wherein the straight cut is spaced apart from a horizontal through-hole extending through a cylinder liner into an adjacent cylinder shaft for passage of gases from the cylinder shaft, and wherein a direction of travel of the milling tool is orientated obliquely relative to an axis of the cylinder shaft.

2. The machining method as claimed in claim 1, wherein the straight cut provides a space between the cylinder and a path of the connecting rod when the piston is raised and lowered, to prevent impact in this region.

3. A cylinder crankcase of an internal combustion engine comprising:

a cylinder shaft including at a base thereof a cylindrical cut for passage of a connecting rod driven by a crankshaft connected through a bore in a first end of the connecting rod, the cylindrical cut being configured to allow lateral travel of the connecting rod in a plane perpendicular to a rotational axis of the bore of the connecting rod when a piston connected to the connecting rod at a second end moves up and down in the cylinder shaft, wherein the cylindrical cut is located in the plane perpendicular to the rotational axis of the bore of the connecting rod, wherein the cylindrical cut is spaced apart from a horizontal through-hole extending through a cylinder liner into an adjacent cylinder shaft for passage of gases from the cylinder shaft, and wherein the cylindrical cut is orientated obliquely relative to an axis of the cylinder shaft.

4. The cylinder crankcase as claimed in claim 3, wherein the cylindrical cut is remote from a space reserved for the travel of the connecting rod when the piston moves up and down in the cylinder.

5. An internal combustion engine, comprising a cylinder crankcase as claimed in claim 3.

6. An internal combustion engine system, comprising:

a cylinder crankcase including a cylinder shaft that includes a cylindrical cut to produce a recess in a base of the cylindrical shaft;

a piston that is vertically displaced along an axis of the cylinder shaft;

a crankshaft; and a connecting rod connected to the crankshaft through a bore in a first end of the connecting rod, the piston being connected at a second end of the connecting rod, and the connecting rod being moved laterally in a space in a plane perpendicular to a rotational axis of the bore of the connecting rod, wherein the cylindrical cut is located in the plane perpendicular to the rotational axis of the bore of the connecting rod such that the connecting rod moves into the recess in the base of the cylindrical shaft, wherein the cylindrical cut is orientated obliquely relative to the axis of the cylinder shaft.

7. The internal combustion engine system as claimed in claim 6, wherein the cylindrical cut is spaced apart from a horizontal through-hole extending through a cylinder liner into an adjacent cylinder shaft for passage of gases from the cylinder shaft.

* * * * *